April 26, 1927.
J. B. JABOULEY
1,626,411
LOOM FOR WEAVING
Filed Feb. 21, 1925
4 Sheets-Sheet 1
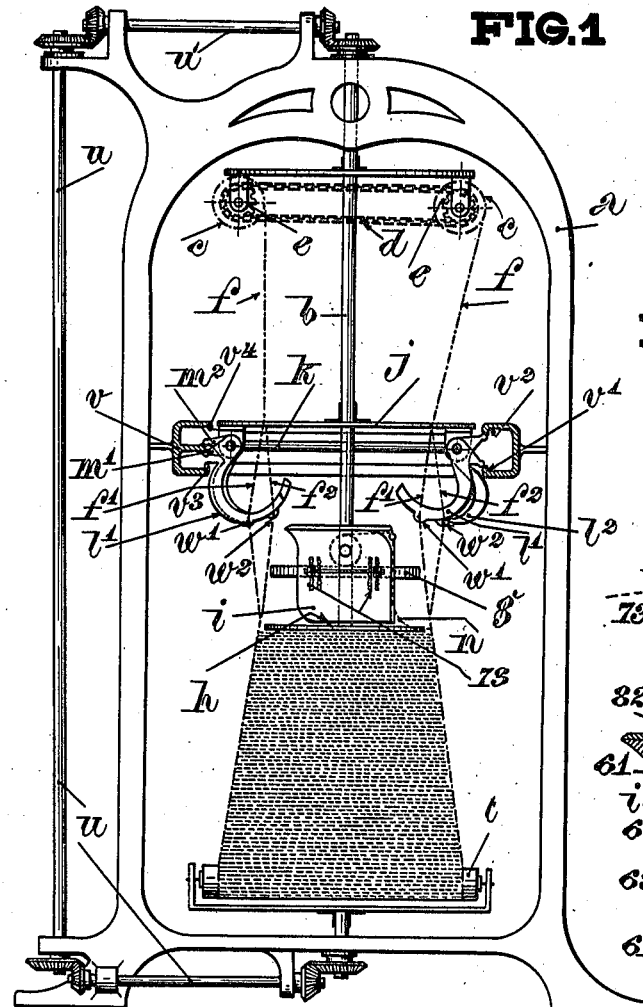
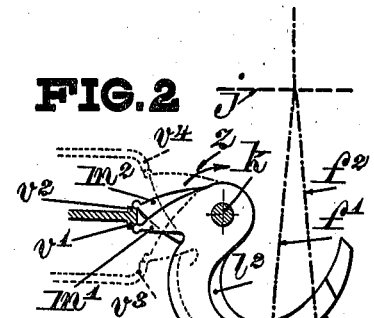
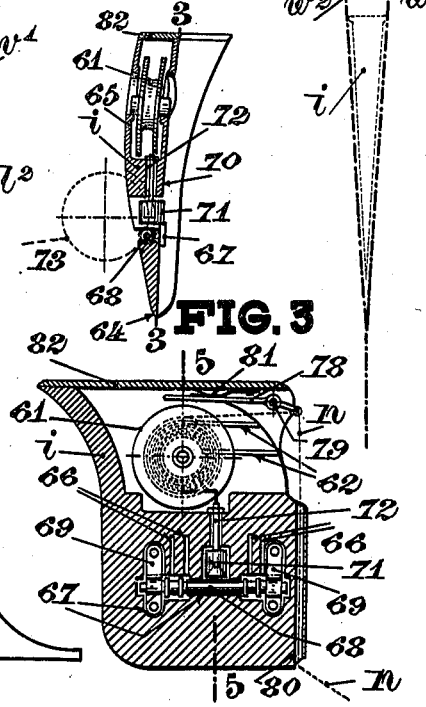
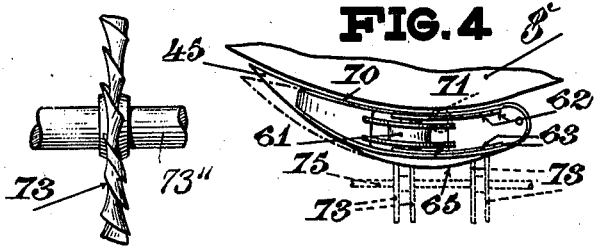
Witnesses
Jean Maureau
Antoine Bocon
Inventor
Joanny Barthélemy Jabouley

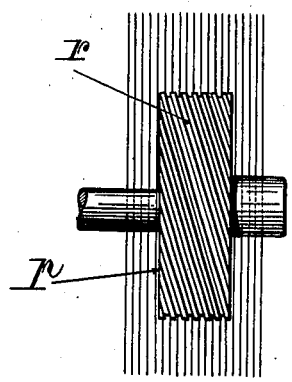
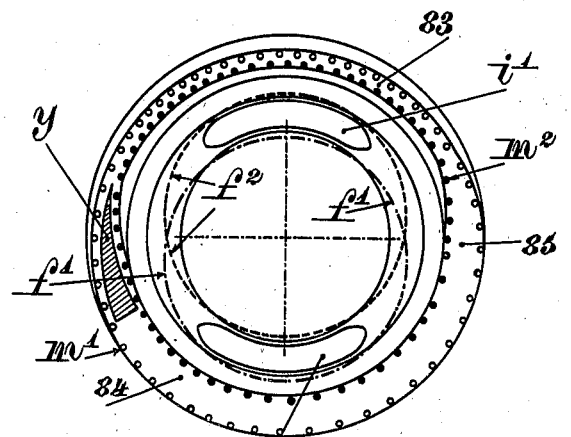
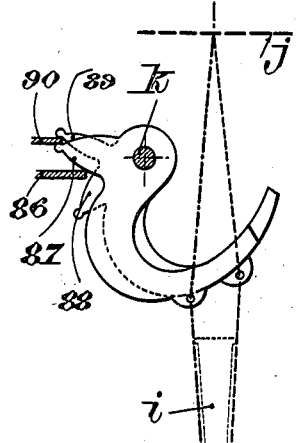
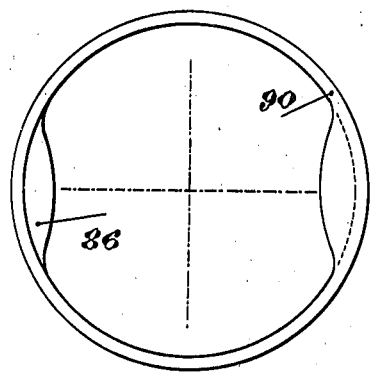
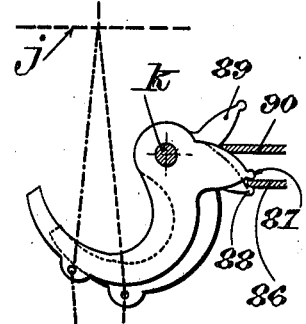
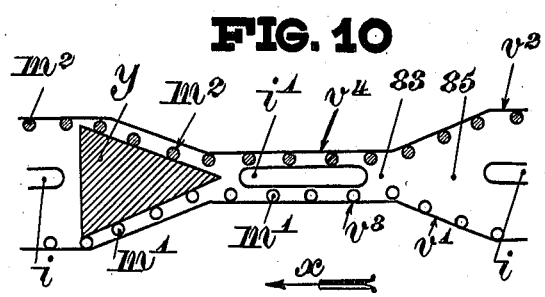

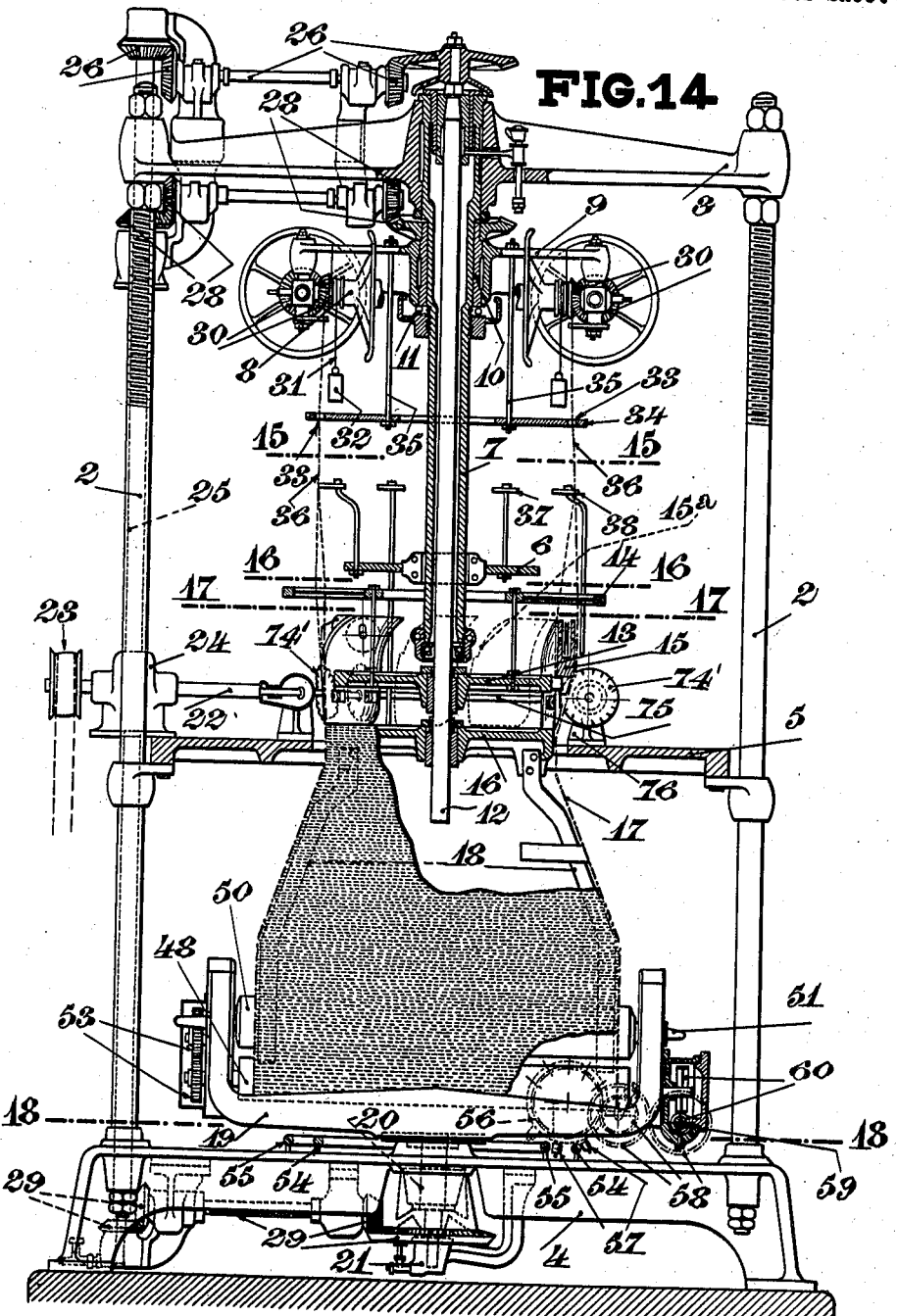

April 26, 1927.
J. B. JABOULEY
1,626,411
LOOM FOR WEAVING
Filed Feb. 21, 1925
4 Sheets-Sheet 4
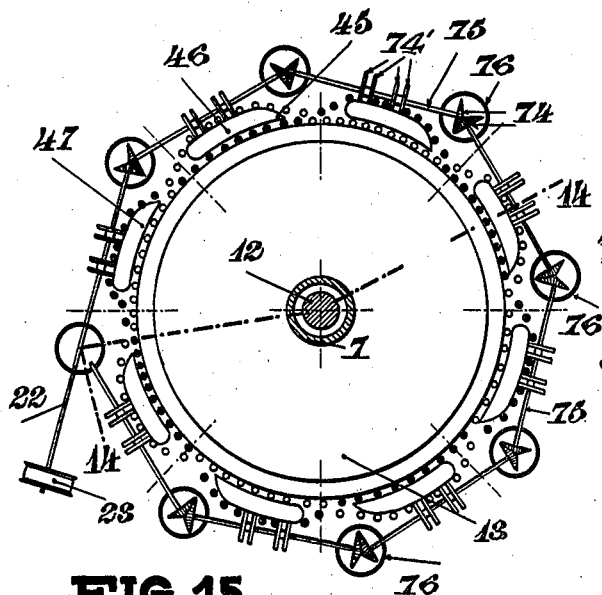
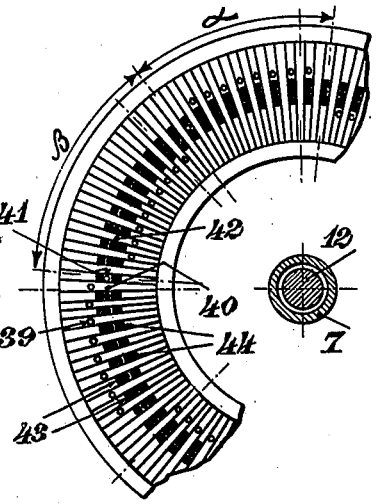
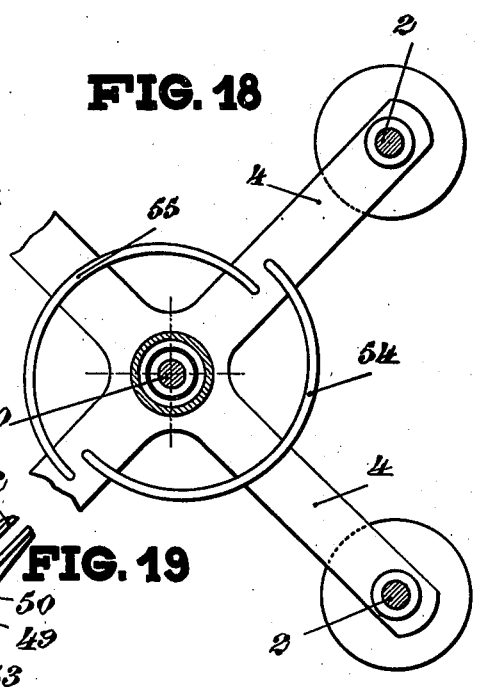

Patented Apr. 26, 1927.

1,626,411

UNITED STATES PATENT OFFICE.

JOANNY BARTHELEMY JABOULEY, OF LYON, FRANCE, ASSIGNOR TO JABOULEY & CO., (FIRM) OF LYON, FRANCE.

LOOM FOR WEAVING.

Application filed February 21, 1925, Serial No. 10,911, and in France February 25, 1924.

This invention relates to a loom in which the warp is disposed circularly and which rotates about its central axis, the threads in their movement passing about the central axis in contact with members which move radially and form the shed, the arrangement of the loom elements being such and the shuttles being constructed in such manner that the lower part of each of same bear on and compress the weft between the warp, beating up the cloth or fabric as it is formed, each shuttle being formed of a hollowed out metallic block containing the weft yarn. The blocks which form the shuttles are each provided with a brake which rests upon the bobbin when the yarn breaks, and each bobbin carries at least one roller which is adapted to contact with rotating discs penetrating into a corresponding opening in the body of the shuttle and so formed as to permit the passage of the warp threads between it and the roller during rotation of the disc, the latter serving to hold the shuttle stationary.

The accompanying drawings show diagrammatically two forms of the invention, one employing two shuttles and the other eight.

Fig. 1 is a vertical section showing the arrangement of the loom.

Fig. 2 shows two shedding arms each operating a warp thread in the open shed position.

Fig. 3 is a section of a shuttle on line 3—3, Fig. 5.

Fig. 4 is a plan of the shuttle with the top removed.

Fig. 5 is a section on line 5—5, Fig. 3.

Figs. 6 and 7 are, respectively, front and side views of the wheel which holds the shuttle against rotation.

Fig. 8 is a view, on an enlarged scale, showing the wheel which holds the shuttle formed with grooves for the passage of the outer warp threads.

Fig. 9 is a diagrammatic view showing the arrangement of the warp and the shuttles and the movements of the shedding arms.

Fig. 10 shows diagrammatically the cam surface for operating the shedding arms.

Figs. 11 and 12 show, respectively, the extreme positions occupied by two shedding arms and their respective warp threads in a modified construction.

Fig. 13 shows the cam surfaces for operating the shedding arms in the modification shown in Figs. 10 and 11.

Fig. 14 is a vertical section on line 14—14, Fig. 17, or 14—14, Fig. 15, of a loom employing eight shuttles.

Fig. 15 is a horizontal section, on an enlarged scale, taken on line 15—15, Fig. 14.

Fig. 16 is a section, on an enlarged scale, taken on line 16—16, Fig. 14, of a part of the circular reed.

Fig. 17 is a section, on an enlarged scale, on line 17—17, Fig. 14, showing the means for passing the warp around the shuttles.

Fig. 18 is a section on line 18—18, Fig. 14.

Fig. 19 is an end view of the supporting means for the shuttle supporting wheels.

According to the invention, the two shuttle looms shown in Figs. 1 to 13 comprise a stationary frame $a$ and a central shaft $b$ driven by the loom and carrying:—

(1) The warp beams $c$, there being two in the example shown, geared together by a chain $d$ passing over toothed wheels $e$ or other suitable means so as to ensure the same tension in all the warp threads $f$;

(2) Two tables $g$ and $h$ which support the shuttles $i$ in the shed and against the fall of the cloth at the time of its formation;

(3) The circular reed $j$, through the slots in which the threads of the warp $f$ pass and below which a bracket $k$ carries the movable shedding arms or healds $l^1$, $l^2$, through each of which one, or, if necessary, more warp threads pass.

Each shedding arm $l^1$, $l^2$ is formed with a projecting end $m^1$, $m^2$ by which it can be moved as required for the positioning of the warp which it guides.

In this case between each pair of shuttles there is provided an arrangement for operating the shedding arms carried on the frame. This may be a pulley having a cam shaped periphery which varies between each pair of shuttles, according to the sense in which the shedding arm is to move, so that the projecting end contacts therewith, or it may be a circular guide, the surface of which contacts with the projecting ends on the shedding arms, the surface adjacent the shuttles being uniform and that between them variable. The shuttles $i$ are curved to the same diameter as that of the loom, resting simply between the warp $f^1$ and $f^2$ and bearing on the weft $n$ inserted by the previous shuttle. The shuttles, as shown in Figs. 3 to 5, are each formed of metal hollowed out on its upper side to house the bobbin 61, the spindle of which rests in slots 62, 63. Each shuttle is shaped as shown in the drawing and is provided on its lower portion with a rounded end 64. On the outer surface 65 of each shuttle four vertical slots 66 are formed which slots open into a longitudinal slot 67 in which is housed a horizontal roller 68 rotating in small bearings 69 arranged at each end. A vertical roller 71 rotating freely about its spindle 72 rests lightly, in its normal position, against the surface 70 of the table $g$, (Fig. 4).

The forward ends 45 of the shuttles are pointed to enable them to enter the shed if this is not sufficiently open for the rest of the shuttle.

To keep the shuttles stationary, rotating grooved discs 73, as shown in Figs. 6 and 7, are arranged along the sides so that the warp threads $f^1$ pass along the grooves as they rotate. For each shuttle four discs 73 are employed, each entering one of the aforementioned slots 66 and bearing against the roller 68 should the shuttle show any tendency to rise.

The shuttles thus rest on the fabric which has been woven and are held in position by the warp threads which pass around them. They also bear against the circular table $y$ through the rollers 71 which allow the warps $f^2$ to pass and react against the pressure of the discs 73. The bobbin 61 carries the weft $n$ which passes over one end of a tension lever 78, pivoted at 79, then into the passage 80 formed in the body of the shuttle and leaves the lower end of said passage at the tail of the shuttle. Thus, if the weft breaks for any reason, the spring 81 carried on the lid or cover 82 and bearing upon the other end of the lever lowers the latter end of the lever onto the bobbin which ceases to rotate. The bobbins may be replaced by spindles, such as employed by spinners, which avoids the necessity of rewinding.

The discs 73 may be replaced by wheels $p$ (Fig. 8) which are formed with endless spiral grooves $r$ along their surface for the passage of the warp $f^1$ to add drag thereto. If necessary, these wheels may have their axes slightly inclined to the horizontal to facilitate the entry of the warp into the grooves $r$.

At the lower part of the loom the finished cloth is wound onto a roller $t$ driven by gearing $u$ from the drive for the shaft $b$.

In order to explain the action of the loom, there is diagrammatically shown in Figs. 9 and 10 the projecting ends $m^1$ and $m^2$ of the shedding arms or healds $l^1$, $l^2$ bearing, respectively, against one or other of the faces $v^1$ or $v^2$ of the central part of the guide $v$ or against the lower surface $v^3$ or the upper surface $v^4$ of said guide, as best shown in Fig. 1.

In the arrangement described it has been assumed that, in manufacturing a uniform cloth, each shedding arm $l^1$ $l^2$ must oscillate on its axis after passing each shuttle $i$, this oscillation being in opposite directions for two adjacent arms and being obtained by the employment of different faces for two adjacent arms, one of which $l^1$ in the description is called the "odd" heald, and the other $l^2$ the "even" heald, (Fig. 2).

The movement of the shedding arms is obtained as follows, (Fig. 10).

The even heald $l^2$ guides the weft $f^2$ which passes through the eye $w^2$. The projecting end $m^2$ of this heald bears against the surface $v^4$ of the guide $v$ which is narrowed at this point at 83. Acted upon by the movement of the reed $j$ in the direction of the arrow $x$ this projecting end $m^2$ of the even heald comes in contact with the tapered surface $y$ on the guide $v$ which deflects it in the direction of the arrow $z$ so that it assumes the position shown in broken lines in Fig. 2; that is to say, the even heald $l^2$ after having moved a distance corresponding to one shed, assumes a position similar to that of the odd heald $l^1$ thus reversing the shed. The projecting end $m^1$ of the neighbouring "odd" arm $l^1$ is displaced in the reverse direction by the surface $y$ and its eye $w^1$ displaces the corresponding warp $f^1$ to $f^2$.

Whilst the projecting ends $m^1$ and $m^2$ of the healds are in the enlarged open space 84 of the guide the warp which they guide forms the shed for the shuttle $i$. Then they are reversed again at the instant when the projecting ends pass over the inclined portions 85 which precede the narrow portion 83 during the traverse of the healds; the warp threads $f^1$ and $f^2$ pass on one side or the other of the next shuttle $i^1$ after which the cycle is repeated (Fig. 9).

This loom operates in the following manner:—The warp beams $c$ supply the warp $f$ which passes through the reed $j$. The shedding arms or healds $l^1$ $l^2$ divide the warp into two distinct parts $f^1$ and $f^2$ to form the shed passing successively round the shuttles $i$ and $i^1$ carrying the weft $n$ on bobbins or pirns 61. The changing of the contour of the circular cam surface $v$, over which the projecting ends $m^1$ and $m^2$ on the shedding arms pass, changes the shed, that is to say, causes some of the warp threads to pass from in front to behind and others to pass from behind to the front before they reach the position of the next shuttle, the underside 64 of which bears on the weft $n$ inserted by the previous shuttle.

Moreover, the shedding arms and their operating cam surface may be modified as in Figs. 11 and 12 so that their oscillatory shedding movements, to suit what is to be produced, may always be obtained by the amount of penetration of the cam surface 86 between two projecting ends. To ensure this, the "odd" arms or healds $l^1$, for example, are only provided with one projecting end 87 and the even arms or healds $l^2$ are provided with two projecting ends 88 and 89. Two similar superimposed circular cams 86 and 90 are provided on their inner peripheries with oppositely acting faces at 180° to each other.

In the position shown in Fig. 11 the cam surface 86 has engaged the projections 87 and 88 and the cam surface 90 is about to engage the projections 87 and 89 after the passage of the shuttle to bring them into the position shown in Fig. 12 where the cam surface 86 comes into action after the passage of the second shuttle in order to return the shedding arms or healds to the initial position shown in Fig. 11.

Fig. 13 shows in plan the shape of the two superimposed cam surfaces 90 and 86 which respectively successively operate the shedding arms or healds to form the shed.

In order not to complicate the drawings, the method of driving is not shown, but it can be done in several ways. It is preferred to employ a small motor arranged at the side of the frame to drive a main shaft $u$ which drives—

(1) A shaft $u'$ geared to a toothed crown wheel on the upper table which carries the warp beams $c$.

(2) A bevel wheel or worm driving the discs 73. Without altering the principle of the invention the loom may be inclined. In this case the weight of the shuttle may be employed alone to prevent its being drawn along by the movement of the warp. Also I may employ any suitable mechanism for operating the projecting ends of the shedding arms or healds so as to provide a loom capable of working at a high speed.

In the second form of the invention Figs. 14–19 the changing of the shed between each shuttle is obtained partly by the passage of the warp over fixed cam surfaces arranged at the right hand side of the space between two shuttles and which directs the warp either to the outside or the inside of the succeeding shuttle and partly by a circular reed having alternate dents completely free allowing alternate warps which pass through to be freely moved under the action of the cams, the other dents being provided with two stops which limit the displacement of the warp or warps passing through them. The point of the shuttle enters into the shed thus formed and, owing to the rotation of the loom, divides the two lines of warp and allows the body of the shuttle to pass.

The woven fabric is drawn off by two take-up rollers driven at the same speed so as to ensure an even tension on the warp. The loom frame consists of four upright members 2 supported by cross members 3, 4 and a table 5 which, together with the stationary table 6 carried on the sleeve 7 suspended from the cross member 3, forms the stationary frame work of the loom. The rotary part of the frame consists of four let-off rollers 8 for the warp which are mounted on the cross member 9 carried by a bracket 10 which rotates on the sleeve 7 and is supported by means of ball bearings 11; the shaft 12, on which is mounted the table 13, carrying the reed 14 and against which the shuttles 15 and 15$^a$ bear; and the table 16 carrying two guides 18 over which the woven cloth 17 passes; and finally the take-up mechanism mounted on an elongated U-shaped member 19 which is driven by the shaft 20 rotating in the cross-members 4 and supported by a bracket 21 affixed to the cross member.

The loom is driven by an electric motor or other means imparting rotation to the shaft 22 through a pulley 23. The shaft 22, through a worm and worm wheel enclosed in a housing 24, drives a vertical shaft 25 which drives the vertical shaft 12 through a transverse shaft and sets of bevel gearing 26. Shaft 22, through sets of bevel gearing 28 and a transverse shaft, drives sleeve 10; and said shaft 22 also drives the shaft 20 through sets of bevel gearing 29. Likewise as shown in Fig. 17 said shaft drives disks 74′ by means of bevel gears carried by a set of shafts arranged about the zone of the machine in which the shuttles are located.

The warp threads are carried on four beams or spools 8 arranged symmetrically with respect to the vertical axis of the loom and geared together by bevel gears 30 arranged at each end of the spools. The unwinding of the warp is, therefore, uniform throughout. Each spool is provided with one or more brakes such as a cable 31 wrapped round the spool shaft and having one end affixed to the cross member 9 and the other carrying a counterweight 32.

The warp threads coming from the beam or spool 8 pass through holes 33 in a disc 34 supported by rods 35 depending from the cross member 9. The arrangement of the holes 33 is such that the formation of the warp, shown as 36 in Fig. 14, after passing through the disc 34, is circular with respect to the axis of the loom so that all threads not in contact with a cam will be located in the same circumference.

Two tables 5 and 6 support a number of cams 37, 38, equal to the number of shuttles, eight being shown, mounted on rods which are arranged respectively at the right hand side of the space between adjacent shuttles. The cam 37 and the succeeding ones are arranged in pairs and project a certain amount outside of the circle formed by the warps 36. The cam 38 and the succeeding one are also arranged in pairs and project a certain amount inside said circle. In this way the rotating warp threads pass successively over each cam and are divided and deflected out of their circular formation to form the sheds.

In the following description four threads 39, 40, 41 and 42 are considered. The other threads successively pass through the same operations.

A circular reed 14 is affixed to the table 13 and is made up as follows (Fig. 16). Alternate pairs of dents are soldered together at 43, 44 which prevents the threads 40, 42 from traversing the length of the dent. These threads 40, 42 and those similar to them are hereinafter referred to as "controlled threads" and are shown in Figure 16 by black dots. The other threads called "free threads" or "uncontrolled threads," shown by circles, can, on the other hand, traverse freely the length of the dents between which they are situated. The radial distance between the extreme positions which the threads 40, 42 can assume is the same as that of the warps above the cams.

Though the cam 37 pushes the warp threads as they pass across it out of their mean position, only the "free threads" 39 and 41 can be displaced to the full without hindrance as shown in Fig. 16.

The "controlled threads" come in contact with the stops 43 in forming the shed. The "free threads" are now on the outside of the shuttles and the "controlled threads" inside. The rotation of the loom has brought this portion of the warp to the front or outer face 45 of the stationary shuttle 46 (Fig. 17) which presses out the warp to allow the body of the shuttle to pass and insert a weft, the threads remaining in the same position during a rotation corresponding to an angle α (Figs. 15 and 16).

The shuttle 46, having been passed, the threads 39, 40, 41 and 42 reach the cam 38 and are forced inwards thereby and the "uncontrolled threads" for the same reason as before, travel a greater distance than the controlled ones, which are restrained by the dents 44. A reverse shed to the last is thus formed with the controlled threads on the outside and the free threads on the inside and this state is maintained during the travel of the loom through an angle β. During this period a shuttle 47 is passed which also inserts a weft whilst beating up the previous weft. The following cam performs a fresh change of shed and the cycle is repeated.

Below the level of the shuttles the warp reaches the table 16 at which point the cloth woven by successive wefts is formed. The tubular fabric 17 produced by this method slides over the arm 18 which forms it into a flattened tube with its sides close together.

The take up motion comprises two driven sand rollers 48 and 49 (Fig. 19), between which the cloth passes, and a roller 50 having a spindle 51 sliding freely in a fork 52 formed in the ends of the U-shaped bracket 19 on which the cloth is wound.

The roller 50 is driven by friction from the roller 49. This latter and the roller 48 are geared together by pinions 53 having equal numbers of teeth and rotating in opposite directions at the same speed.

The drive for the roller 48 is obtained as follows:—Two semi-circular cam elements 54 and 55, which are eccentric with respect to the axis of the loom, are mounted on the cross member 4. A wheel 56 carrying small rollers 57 (ten for example) is mounted on the member 19, the rollers contacting with the cam elements whose corresponding ends are spaced apart a distance equal to that between two rollers. In this way at each rotation of the loom the wheel 56 rotates a distance equal to the pitch of two rollers, this rotation being transmitted through the gearing 58 to the shaft 59 which drives the roller 48 through a worm and worm wheel 60.

The rotation of the different discs for an eight shuttle loom is obtained by means of bevel gearing 74 (Fig. 17) arranged at the ends of each shaft 75, mounted in bearings 76. One of the shafts 75 is formed as a prolongation of the shaft 22 carrying the belt pulley 23.

Of the eight shuttles, four have their noses pointing slightly outwards as shown for the shuttle 47 (Fig. 17) and as is shown in broken lines in Fig. 4 so as to enter the shed, the mean radius of which is slightly greater than the radius of the shuttle, and the other four shuttles, such as 46, have their noses pointing slightly inwards as shown in full lines in Fig. 4 for a similar reason. When the shed is formed the warp threads are distributed over two circumferences of different diameters.

If a larger number of warp threads to the inch are required from the same loom a table 16 is employed of smaller diameter than the reed. The length of circumference, over which the same number of warps are disposed, is reduced and the cloth is woven more closely. The warp, instead of being cylindrical, takes up a conical formation below the reed and the aforementioned table.

Instead of arranging the shuttles vertically they may be horizontal or inclined, the warp being arranged horizontally for a distance before meeting a shuttle. The warp may also be passed through healds, the raising of which allows for different weaves.

What I claim as my invention and desire to protect by Letters Patent is:—

1. In a circular loom, means for supporting a rotary cylindrical series of warps, one or more shuttles, a table supporting the shuttles, means to form a shed for each shuttle, means for opening and closing the shed continuously in timed relation with the shuttle, and rotating elements journalled outside the outer shed and reaching through it into engagement with said shuttles, said elements having grooves to receive individual warps.

2. In a circular loom, means for supporting a rotary cylindrically-arranged series of warps, spaced cams acting alternately to force said warps inward and outward to form a shed, a reed cooperating with said cams, said reed comprising dents and having long spaces between certain dents and short spaces between others, and stationary shuttles cooperating with said warps.

3. In a circular loom, a stationary frame, a set of shuttles, a set of warp beams, means for driving the beams in synchronism, a circular shed forming reed through which the warps pass, means on the frame for holding said reed and said shuttles against rotation including discs extending through the warp, means on the stationary frame for rotating the discs, a take-up, and means on the stationary frame for driving the take-up.

4. In a circular loom, means for forming a fabric, a take-up beam rotatable about the axis of the loom, circumferentially extending cam elements below the beam, and planetary gearing rotating with said beam, said gearing including an element co-acting with said cam elements to revolve the beam.

In testimony whereof I have hereunto set my hand.

JOANNY BARTHELEMY JABOULEY.